(12) United States Patent
Lee et al.

(10) Patent No.: US 9,477,850 B2
(45) Date of Patent: Oct. 25, 2016

(54) METHOD FOR DISPLAYING CONTENTS AND ELECTRONIC DEVICE THEREOF

(71) Applicant: Samsung Electronics Co., Ltd., Suwon-si, Gyeonggi-do (KR)

(72) Inventors: Tae-Young Lee, Anyang-si (KR); Soo-Jin Park, Suwon-si (KR); Heung-Sik Shin, Jeonju-si (KR); Bo-Hyun Yu, Uiwang-si (KR); Ki-Tae Lee, Yongin-si (KR); Cheol-Ho Cheong, Seoul (KR); Jin-Gil Yang, Suwon-si (KR); Jae-Seok Joo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/324,625

(22) Filed: Jul. 7, 2014

(65) Prior Publication Data
US 2015/0020190 A1 Jan. 15, 2015

(30) Foreign Application Priority Data
Jul. 15, 2013 (KR) .......................... 10-2013-0082792

(51) Int. Cl.
*H04L 29/06* (2006.01)
*G06F 21/84* (2013.01)
*G06F 21/62* (2013.01)

(52) U.S. Cl.
CPC ............ *G06F 21/84* (2013.01); *G06F 21/6209* (2013.01); *G06F 2221/2149* (2013.01)

(58) Field of Classification Search
CPC ........................... G06F 21/84; G06F 21/6209
USPC ........................................................... 726/16
See application file for complete search history.

(56) References Cited

U.S. PATENT DOCUMENTS

| 8,156,341 B2* | 4/2012 | Lee .................... G06F 21/32 713/179 |
| 2002/0116508 A1* | 8/2002 | Khan .................... H04L 12/587 709/229 |
| 2005/0164675 A1* | 7/2005 | Tuulos et al. ................. 455/410 |
| 2005/0224573 A1* | 10/2005 | Yoshizane .......... G07C 9/00087 235/379 |
| 2008/0010679 A1* | 1/2008 | Kim ........................ G06F 21/80 726/19 |
| 2008/0141354 A1* | 6/2008 | Shigetomi ............. H04L 9/3231 726/7 |
| 2009/0091420 A1* | 4/2009 | Dobashi ............. G06K 9/00288 340/5.2 |
| 2009/0158423 A1* | 6/2009 | Orlassino ................ G06F 21/32 726/19 |
| 2010/0205667 A1* | 8/2010 | Anderson et al. .............. 726/19 |
| 2011/0138176 A1* | 6/2011 | Mansour ............... H04L 9/3218 713/168 |
| 2011/0231909 A1* | 9/2011 | Shibuya .................. G06F 21/31 726/5 |
| 2011/0321141 A1* | 12/2011 | Zeng .................. H04L 63/0853 726/5 |

(Continued)

FOREIGN PATENT DOCUMENTS

JP 2008-182392 A 8/2008
JP 2008-206166 A 9/2008

(Continued)

*Primary Examiner* — Michael S. McNally
(74) *Attorney, Agent, or Firm* — Jefferson IP Law, LLP

(57) ABSTRACT

An electronic device is provided. The electronic device includes an output module, a sensing module, and a processor. The output module is configured to output contents. The sensing module is configured to obtain at least one of user information and environment information. The processor is configured to control an operation of the electronic device in response to at least one of the user information and the environment information depending on an attribute of the contents.

20 Claims, 24 Drawing Sheets

(56) References Cited

U.S. PATENT DOCUMENTS

| | | | |
|---|---|---|---|
| 2012/0167188 A1* | 6/2012 | Poornachandran | H04L 63/0853 726/7 |
| 2012/0216245 A1* | 8/2012 | Vignisson | G06F 21/62 726/1 |
| 2013/0247175 A1* | 9/2013 | Nechyba | G06F 21/32 726/19 |
| 2013/0329970 A1* | 12/2013 | Irie | G06K 9/00288 382/118 |
| 2014/0123311 A1* | 5/2014 | Pegg | G06F 21/10 726/27 |
| 2014/0241594 A1* | 8/2014 | Ikeda | G06F 3/005 382/118 |

FOREIGN PATENT DOCUMENTS

| | | |
|---|---|---|
| KR | 10-2005-0079845 A | 8/2005 |
| KR | 10-2008-0040166 A | 5/2008 |
| KR | 10-2008-0049972 A | 6/2008 |
| KR | 10-2008-0049973 A | 6/2008 |

* cited by examiner

METHOD FOR DISPLAYING CONTENTS AND ELECTRONIC DEVICE THEREOF

CROSS-REFERENCE TO RELATED APPLICATION(S)

This application claims the benefit under 35 U.S.C. §119(a) of a Korean patent application filed on Jul. 15, 2013 in the Korean Intellectual Property Office and assigned Serial number 10-2013-0082792, the entire disclosure of which is hereby incorporated by reference.

TECHNICAL FIELD

The present disclosure relates to a method for displaying content and an electronic device thereof.

BACKGROUND

Recently, as an electronic device develops rapidly, an electronic device that enables information or data exchange is variously used. Generally, the electronic device has a display means and an input means, and may provide a function for reproducing contents.

The contents include digital contents reproducible at the electronic device, and may include a movie, music, games, an electronic book, etc., and a kind of supplied contents becomes diversified. A reading grade may be set to the contents, and only a user suitable for a reading grade or only a user who has successfully performed an authentication operation should read contents.

Recently, various kinds of contents may be easily available, and a user may perform an authentication operation regarding contents via a simple authentication procedure such as a password input.

The electronic device may be controlled by another user, and a password may be exposed, so that another user may reproduce contents not suitable for a relevant grade. In addition, after an authentication operation has been performed before reproduction of contents, the electronic device cannot limit viewing even when another user views contents.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for reproducing limited contents in an electronic device.

Another aspect of the present disclosure is to provide an apparatus and a method for determining user information and environment information that reproduce contents in an electronic device.

Still another aspect of the present disclosure is to provide an apparatus and a method for controlling contents reproduction with consideration of user information and environment information that reproduce contents in an electronic device.

Yet another aspect of the present disclosure is to provide an apparatus and a method for performing operations such as a turn-off mode, an image replacement mode, a sleep mode, a text message output mode, a message transmission mode to another device, a contents inquiry prohibition mode, an output limit mode or a haptic feedback mode, etc. on an electronic device in case of stopping reproduction of contents with consideration of user information and environment information that reproduce contents in the electronic device.

In accordance with an aspect of the present disclosure, an electronic device is provided. The electronic device includes an output module configured to output contents, a sensing module configured to obtain at least one of user information and environment information, and a processor configured to control an operation of the electronic device in response to at least one of the user information and the environment information depending on an attribute of the contents.

In accordance with another aspect of the present disclosure, a method for providing contents in an electronic device is provided. The method includes obtaining, by the electronic device, at least one of user information and environment information, and determining an operation of the electronic device in response to at least one of the user information and the environment information depending on an attribute of the contents.

In accordance with still another aspect of the present disclosure, a method for providing contents in an electronic device is provided. The method includes determining, by the electronic device, an attribute of the contents, obtaining at least one of user information and environment information when a reproduction of the contents is limited based on the attribute of the contents, and controlling a reproduction of the contents in response to the user information or the environment information.

In accordance with yet another aspect of the present disclosure, a non-transitory computer-readable recording medium is provided. The non-transitory computer-readable recording medium having a program recorded thereon, the program causing a computer to execute a method including obtaining at least one of user information and environment information, and determining an operation mode of the electronic device in response to at least one of the user information and the environment information depending on an attribute of the contents.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
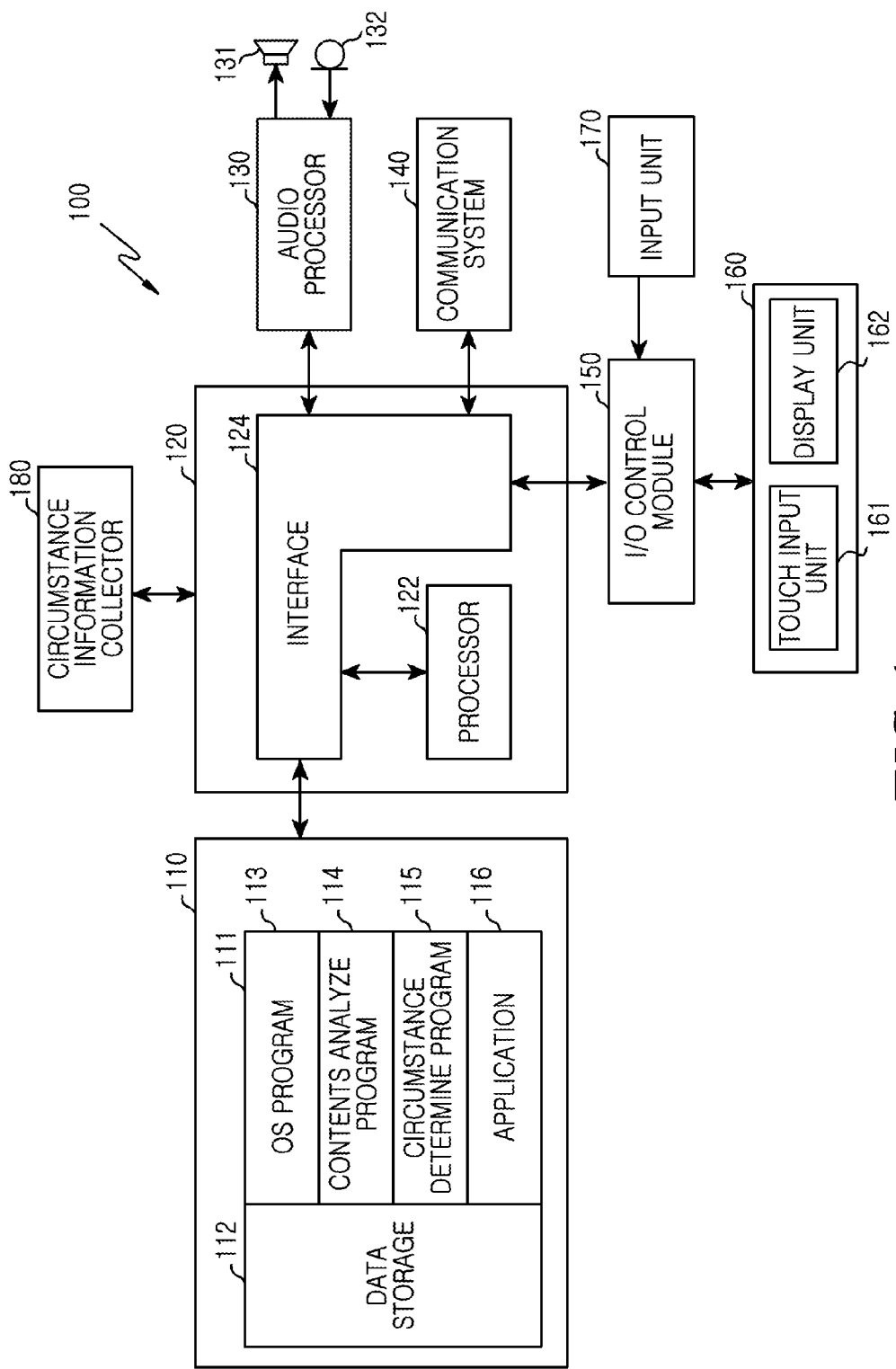
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A touchscreen variously used recently is an input or display device performing input and display of information on one screen. In a case of using the touchscreen, the electronic device may increase a display area by removing a separate input unit such as a keypad. For example, in a case of using a full-touch type where a touchscreen is applied to an entire screen, the electronic device may extend a screen size by utilizing an entire surface of the electronic device as a screen.

The electronic device may reproduce digital contents such as a movie, music, games, an electronic book, a photo, a web page, etc.

A reading grade may be set to the contents, and the electronic device may reproduce contents corresponding to a user's grade.

However, recently, various kinds of contents may be easily available, and a user may perform an authentication operation regarding contents via a simple authentication procedure such as a password input, but another user may reproduce contents unsuitable for a relevant grade due to exposure of a password.

To provide correct contents to a user, an apparatus and a method for improving a contents reproduction function in the electronic device are required.

In the description below, an apparatus and a method for controlling reproduction of contents based on user information or environment information reproducing contents in an electronic device according to an embodiment of the present disclosure are provided.

The electronic device may provide feedback with respect to limited contents based on user information or environment information. The providing of the feedback is to control reproduction of contents, and may be used as meaning equivalent to content providing corresponding information for contents. The electronic device may control an output for a screen and a volume as a feedback corresponding to user information or environment information with respect to limited contents. For example, in a case where the user information or the environment information is not suitable for a predetermined reference, the electronic device may perform operations such as a turn-off mode for the electronic device, an image replacement mode, a sleep mode, a text message output mode, a message transmission mode to another device, a contents inquiry prohibition mode, an output limit mode, or a haptic feedback mode, etc.

In the following description, contents including content whose reproduction may be limited may be defined as limited contents. The content whose reproduction may be limited may include a sexual or violent content, or content unallowable under a specific condition (a nation, a culture, a religion, etc.). In addition, for example, contents including content unallowable in a specific nation may be limited contents in a case where the contents are reproduced in the relevant nation, and may not be limited contents in a case where the contents are reproduced in other nations.

The electronic device may analyze, for example, an image of contents or sound additional information, etc. to understand the attribute of contents. The electronic device may determine whether contents which a user intends to reproduce is limited contents based on the attribute of the contents.

The user information is information representing whether a user is an allowed user with respect to limited contents. The electronic device may analyze an image or voice information, etc. of a user to determine whether the user is a user registered in advance or a user of an age group which may reproduce limited contents.

The environment information is information representing an area where reproduction of limited contents is allowed. The electronic device may determine a current position to determine whether the current position belongs to an area registered in advance or an area where limited contents may be reproduced. The environment information is information representing a circumstance where limited contents may be reproduced. The electronic device may recognize, for example, movement information, brightness information, or ambient sound information, etc. to determine whether an environment is a circumstance where limited contents may be reproduced. The electronic device may recognize environment information using an image sensor, a microphone, or a plurality of sensors which may determine a movement or a circumstance.

The electronic device may be a portable electronic device, and may be a device such as a portable terminal, a mobile terminal, a media player, a tablet computer, a handheld computer, or a Personal Digital Assistant (PDA). Also, the electronic device may be an arbitrary portable electronic device including a device combining two or more functions among these devices. According to another embodiment, the electronic device may include any kind of an electronic device including a display and an input unit. For example, the electronic device may include a desktop computer, a refrigerator, a multi-function peripheral, a video game console, a digital camera, a Mobile Internet Device (MID), an Ultra Mobile PC (UMPC), a navigation, a smart TV, a digital clock, an MP3 reproducer, etc.

Also, though the present disclosure has described an electronic device including a touchscreen, it would be easily understood by a person of ordinary skill in the art that embodiments described in the present specification may be properly applicable to an electronic device or a computing device having a display and a different input means even though it does not include the touchscreen.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating an electronic device according to an embodiment of the present disclosure.

Referring to FIG. 1, an electronic device 100 is illustrated, the electronic device 100 may include a memory 110, a processor unit 120, an audio processor 130, a communication system 140, an Input/Output (I/O) control module 150, a touchscreen 160, an input unit 170, or a circumstance information collector 180. At least one of these elements may be provided in the plural.

The memory 110 may include a program storage 111 or a data storage 112. The program storage 111 may include an Operating System (OS) program 113, a contents analyze program 114, a circumstance determine program 115, or at least one application 116. The processor unit 120 may include a processor 122 or an interface 124. The touchscreen 160 may include a touch input unit 161 or a display unit 162.

The program storage 111 of the memory 110 may store a program for controlling an operation of the electronic device 100, and the data storage 112 may store data occurring during execution of a program. For example, the data storage 112 may store various updatable data for storage such as a phonebook, calling messages, or received messages, and may store reference information for determining limited contents, user set information, environment information, etc. For example, the data storage 112 may store an image that will replace limited contents, a message, information of a peripheral informing reproduction of limited contents, a method for controlling a screen/volume for limited contents, etc. The feedback information is operation information of the electronic device to respond to a user who reproduces limited contents, and may have meaning equivalent to the above-mentioned corresponding information.

The OS program 113 may include various software elements for controlling the general system operation. The control of this general system operation may mean, for example, memory management or control, storage hardware (device) control or management, power control or management, etc. The OS program 113 may perform a function for swift communication between various hardware (devices) and program elements (modules).

The contents analyze program 114 may include various software elements for analyzing the attribute (e.g., a kind, a characteristic, etc.) of contents. The contents analyze program 114 may determine limited contents based on the attribute of the contents.

The attribute of the contents may include one or more information where reproduction of contents may be limited, such as a reading grade, whether a religious or cultural, or legal taboo expression exists, and its level, a violence level, a sexuality level, etc. In addition, contents including information where reproduction may be limited is limited contents, and may mean contents including, for example, feedback information.

The contents analyze program 114 may analyze image information, sound information, text information, additional information regarding contents, etc. to understand the attribute of the contents.

The contents analyze program 114 may analyze image information to understand the attribute of contents as in the following embodiment.

The contents analyze program 114 may determine color, texture, a pattern, a shape, a silhouette, movement, color change, a body behavior or symbol, etc. to understand the attribute of contents.

For example, in a case where a skin color of an image corresponds to a first range, for example, where the skin color exceeds a reference value, the contents analyze program 114 may determine a case where the shape and the pattern of the operation of one or more characters correspond to a predetermined shape or pattern. In a case where the skin color is equal to or greater than a predetermined matching degree, the contents analyze program 114 may determine reproduction of the contents may be limited due to sexuality. For another example, in a case where a blood color, for example, exceeds a reference value, or a weapon shape appears, the contents analyze program 114 may determine reproduction may be limited due to violence. For still another example, in a case where a shape meaning an insult behavior, a symbol or flag symbolizing a specific political faction, a racial discriminative symbol, a religious, cultural, or legal taboo content, etc. exists in an image, the contents analyze program 114 may determine reproduction may be limited.

The contents analyze program 114 may analyze sound information to understand the attribute of contents as in the following embodiment.

The contents analyze program 114 may analyze an audio track included in the contents to determine the attribute of contents using one or more references such as a sound pattern, an acoustic pressure of a sound, content by voice recognition or a repetition degree of the same sound pattern, etc. For example, in a case where a sound such as abuse, gunshot, groan or scream, etc. is detected, the contents analyze program 114 may determine reproduction may be limited due to sexuality and violence according to a predetermined reference such as a pattern, a sound pressure, content, or a repetition degree, etc. of the relevant sound.

The contents analyze program 114 may analyze text information to understand the attribute of contents as in the following embodiment.

The contents analyze program 114 may analyze a subtitle file or a caption track included in the contents to determine slang, abuse, sexual or violent terminologies and determine reproduction may be limited.

The contents analyze program 114 may analyze additional information to understand the attribute of contents as in the following embodiment.

The contents analyze program 114 may understand the attribute of contents using additional information such as meta information, a thumbnail, preview data, pre listen data, view thoughts (appraisal) for contents, a contents age grade mark or symbol, etc.

The contents analyze program 114 may understand the attribute of contents, for example, while reproducing the contents or before reproducing the contents.

The circumstance determine program 115 may include various software elements that may determine information of a user who intends to reproduce contents or environment information, etc.

The user information may mean information representing whether a user is an allowed user with respect to limited contents, and the environment information may mean information of an area where reproduction of limited contents is possible, or a circumstance detected via a sensor unit of the electronic device, etc.

The circumstance determine program 115 may analyze an image or voice information of a user to determine whether the user is a user registered in advance or a user of an age that may reproduce limited contents.

The circumstance determine program 115 may determine whether a current position belongs to an area registered in advance or an area where contents may be reproduced. The circumstance determine program 115 may recognize a time, schedule information registered in a scheduler, movement information, brightness information, or ambient sound information, etc. to determine whether an environment is a circumstance where limited contents may be reproduced. The circumstance determine program 115 may recognize environment information using an image sensor, a microphone, a plurality of sensors that may determine a movement or a circumstance, etc.

The circumstance determine program 115 may provide feedback for limited contents. For example, the circumstance determine program 115 may provide feedback for contents based on user information or environment information.

For example, when the attribute of contents corresponding to limited contents is understood, the circumstance determine program 115 may perform operations such as a turn-off mode for the electronic device, an image replacement mode, a sleep mode, a text message output mode, a message transmission mode to another device, a contents inquiry prohibit mode, an output limit mode, or a haptic feedback mode, etc. in response to the user information or the environment information.

The circumstance determine program 115 may process to delete history information (e.g., an address of a limited site, a storage path of limited contents, etc.) for limited contents while providing feedback for contents.

Though not shown, the program storage 111 may store a display program. The display program may include various software elements for providing and displaying graphics on the touchscreen 160. A terminology of graphics may be used as meaning that includes text, a web page, an icon, a digital image, a video, an animation, or a widget, etc.

The display program may include various software elements related to a user interface.

The display program may determine whether a user who is not allowed for the attribute of contents reproduces the contents, and control a contents reproduce screen to display the same.

For example, the display program may display contents to which feedback information has been applied such as a replacement image or a replacement message, etc.

The application 116 may include a software element for at least one application installed to the electronic device 100, and may also include a program for controlling contents reproduction based on the user information or the environment information. This means that the contents display function may be provided as one application as described above.

A program included in the program storage 111 is a set of instructions, and may be expressed as an instruction set. At least one of programs included in the program storage 111 may be expressed as a hardware configuration. For example, the electronic device may include an operating system module, a contents analyze module, a circumstance determine module, or a display module, etc.

The processor module 120 may include at least one processor 122 or an interface 124. The processor 122 or the interface 124 may be integrated in at least one integrated circuit or implemented as a separate element.

The interface 124 may serve as a memory interface for controlling an access of the processor 122 and the memory 110.

The interface 124 may serve as a peripheral interface for controlling connection between I/O peripherals of the electronic device 100 and the processor 122.

The processor 122 may determine user information and environment information using at least one software program, and control to provide feedback for limited contents in response to the user information or the environment information.

At this point, the processor 122 may include a processor for executing at least one program stored in the memory 110 and controlling to perform a function corresponding to a relevant program.

For example, a contents display function of the electronic device 100 may be performed using a software such as a program stored in the memory 110 or a hardware such as the processor 122.

The audio processor 130 may provide an audio interface between a user and the electronic device 100 via a speaker 131 or a microphone 132. The speaker 131 may output an audio signal to which feedback for limited contents has been applied via the speaker 131 according to an embodiment of the present disclosure, and receive information for determining user information and environment information via the microphone 132.

The communication system 140 may perform a communication function for voice communication or data communication of the electronic device 100. At this point, the communication system 140 may be divided to a plurality of communication sub-modules supporting different communication networks. For example, though not limited thereto, the communication network may include a Global System for Mobile Communication (GSM) network, an Enhanced Data GSM Environment (EDGE) network, a Code Division Multiple Access (CDMA) network, a Wide (W)-CDMA network, a Long Term Evolution (LTE) network, an Orthogonal Frequency Division Multiple Access (OFDMA) network, a wireless Local Area Network (LAN), a Bluetooth network, or Near Field Communication (NFC), etc.

The I/O control module 150 may provide an interface between an I/O unit such as the touchscreen 160 or the input unit 170, and the interface 124.

The touchscreen 160 is an I/O unit for performing display of information or input of information, and may include the touch input unit 161 and the display unit 162.

The touch input unit 161 may provide touch information detected via a touch panel to the processor unit 120 via the I/O control module 150. At this point, the touch input unit 161 changes touch information to an instruction structure such as touch_down, touch_move, or touch_up to provide the same to the processor unit 120, and may provide input data that inputs information regarding a user who reproduces contents and feedback information to the user to the processor unit 120.

The display unit 162 may display state information of the electronic device 100, a character input by the user, a moving picture, or a still picture, etc. For example, the display unit 162 may display a contents reproduction operation based on information regarding the user who reproduces contents or environment information. For example, the display unit 162 may display contents to which feedback information has been applied.

The input unit 170 may provide input data generated by the user's selection to the processor unit 120 via the I/O control module 150. For example, the input unit 170 may include only a control button for controlling the electronic device 100. For another example, the input unit 170 may provide input data that inputs information regarding the user who reproduces contents and feedback information to the user to the processor unit 120. The electronic device according to the present disclosure may use a key button, a track ball, a thumb stick, a stylus pen, a mouse, an electronic pen, a fingerprint recognizer, a joystick, or an eye-tracker as the input unit.

The circumstance information collector 180 may collect information for determining information regarding a user who desires to reproduce contents or environment information, etc. The environment information may include information representing an area where contents reproduction has been allowed or has not been allowed, and information representing a circumstance where contents reproduction has been allowed or has not been allowed.

The circumstance information collector 180 may include at least one of an image sensor, a microphone, or a plurality of sensors (e.g., a grip sensor, a geomagnetic sensor, an acceleration sensor, a digital compass, a horizon sensor, a light sensor, a proximity sensor) that may determine a state of the electronic device, a module that may obtain position information, and a wired or wireless signal detect module.

Though not shown, the electronic device 100 may include elements for providing additional functions such as a broadcast reception module for receiving broadcasting, a digital sound source reproduction module such as an MP3 module, a short distance wireless communication module for short distance wireless communication, etc., and software for operations of these elements.

The electronic device according to an embodiment of the present disclosure may include the following construction.

According to an embodiment, the electronic device 100 may include an output module (e.g., the display unit 162, etc.) for outputting contents, a sensing module (e.g., the touch input unit 161, the input unit 170, etc.) for obtaining at least one of user information and environment information, and a processor configured to control an operation of the electronic device in response to at least one of the user information and the environment information depending on the attribute of the contents. The environment information may include at least one of position information for determining limitation of the operation of the contents and circumstance information. The circumstance information may be configured to include at least one of a time, an ambient noise, ambient brightness, and movement of the electronic device 100.

The processor 122 may determine user setting information corresponding to the user information using at least one of real-time user information or user information stored in advance (e.g., advance user information). The user setting information may be configured to include information regarding an operation mode of the electronic device corresponding to the user information.

The processor 122 may be configured to determine whether the user information is authenticated depending on the attribute of the contents. The processor 122 may be configured to authenticate the user information using the user setting information including operation mode information of the electronic device 100 corresponding to the user information. In a case where the user setting information corresponding to the user information does not exist, the processor 122 may be configured to limit an output of the contents and register user setting information corresponding to the user information.

The processor 122 may be configured to control an operation of the electronic device 100 based on the authentication result. In a case where the sensing module obtains a plurality of user information, the processor 122 may be configured to determine a plurality of authentication results corresponding to the plurality of user information. In a case where at least one of the plurality of authentication results is unsuitable for providing the contents, the processor 122 may be configured to limit an output of the contents.

In a case where the output of the contents is limited, the operation mode of the electronic device 100 may be at least one of a turn-off mode for at least one unit among the output module (e.g., the display unit 162, etc.), an image replacement mode, a sleep mode of the electronic device 100, a text message output mode, a message transmission mode to another device, a contents inquiry prohibit mode, a haptic feedback mode, and a low specification mode of at least one unit among the output module (e.g., the display unit 162, etc.).

The processor 122 may be configured to analyze the attribute of the contents during an operation of the contents or before the operation.

The processor 122 may be configured to analyze the attribute of the contents using at least one of an image analyze method, a sound analyze method, a text analyze method, a method for analyzing an intro signal of an image, a specific symbol recognize method, and an additional contents analyze method.

Figure 2:
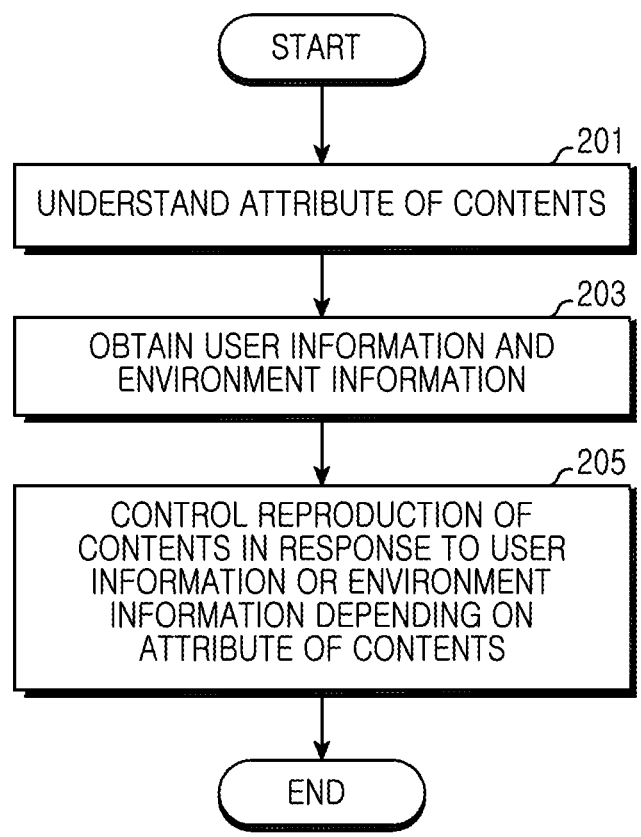
FIG. 2 is a flowchart illustrating a contents reproduction operation of an electronic device according to an embodiment of the present disclosure.

FIG. 2 is a flowchart illustrating a contents reproduction operation of an electronic device according to an embodiment of the present disclosure.

Referring to FIG. 2, contents may be digital contents that may be reproduced in an electronic device, and may include a movie, music, games, an electronic book, etc. The contents should be reproduced only for an allowed user or only under an allowed environment. For example, contents of sexuality or violence should not be reproduced for a user who is under age according to an age grade given by the sexuality or violence level, and should not be reproduced in a public place. For another example, in a case where the contents are regulated by legislation of a nation where a user is positioned, the contents are not reproducible or only legal content should be reproduced.

The electronic device according to an embodiment of the present disclosure may control reproduction of contents based on user information or environment information to reproduce the contents for only an allowed user or under only an allowed environment depending on the attribute of the contents.

To perform the above operation, the electronic device may understand the attribute of contents in operation 201.

To determine whether contents include information whose reproduction may be limited, the electronic device may determine, for example, whether a reading grade has been set to contents to be reproduced, whether a religious, cultural, or legal taboo expression is included in contents, or whether violent or sexual content is included in contents, etc.

The electronic device may analyze image information, sound information, text information, additional information of contents, etc. to understand the attribute of the contents. For example, the electronic device may determine color information, texture, a pattern, a shape, a silhouette, movement, color change, a body behavior or symbol, etc. included in an image to determine whether information whose reproduction may be limited is included in contents.

For another example, the electronic device may analyze an audio track or subtitle of contents to determine whether information (e.g., slang, abuse, a sexual or violent terminology) whose reproduction may be limited is included in the contents.

For still another example, the electronic device may analyze additional information such as meta information, a thumbnail, preview data, pre-listen data, or contents view thoughts (appraisal) for contents to determine whether information (e.g., an age grade, a mark representing a regulation object, content of summary abstract information, slang, abuse, a sexual or violent terminology) whose reproduction may be limited is included in the contents.

The electronic device may understand the attribute of contents during reproduction of the contents or before reproduction of the contents. The electronic device may determine a scene including information whose reproduction may be limited during reproduction of the contents, or determine whether contents are contents including information whose reproduction may be limited before reproduction of the contents. The information may be the contents themselves, contents information added together to a site that may access the contents, other contents information retrieved via a search engine in connection with the contents, etc.

The electronic device may obtain user information or environment information, etc. in operation 203. The user information may mean information representing whether a user is an allowed user with respect to limited contents, and the environment information may mean information such as an area or a circumstance, etc. that may reproduce limited contents. In addition, in a case of determining the attribute of contents including information whose reproduction may be limited, the electronic device may obtain the user information and the environment information.

The electronic device may obtain user information using voice or an image, etc. of a user who intends to reproduce contents.

For example, the electronic device may determine at least one of a user's voice, facial image, and fingerprint image to determine whether the user is a user registered in advance who is allowed to reproduce contents, or a user corresponding to an age group to which contents reproduction has been allowed.

The electronic device may determine whether a position of a user belongs to an area registered in advance which is allowed to reproduce contents, or an area where contents may be reproduced, and may recognize schedule information, etc. stored on a scheduler to determine whether an environment is a circumstance where limited contents may be reproduced.

The electronic device may control reproduction of contents in response to user information or environment information depending on the attribute of the contents in operation 205.

For example, when the attribute of contents corresponding to limited contents is understood, the electronic device may perform operations such as a turn-off mode for the electronic device, an image replacement mode, a sleep mode, a text message output mode, a message transmission mode to another device, a contents inquiry prohibition mode, an output limit mode or a haptic feedback mode, etc. in response to the user information or environment information.

The turn-off mode may represent a mode that turns off power of the electronic device so that limited contents may not be reproduced, and the sleep mode may represent a mode that stops the rest of functions except a minimum module (a communication module) of the electronic device so that limited contents may not be reproduced. The image replacement mode may represent a mode that replaces a screen whose reproduction may be limited by another image and outputs the same. The text message output mode may represent a mode that replaces text whose reproduction may be limited by another text and outputs the same. The message transmission mode to another device may represent a mode that transmits a message informing a circumstance where limited contents are reproduced to another device. The output limit mode may represent a mode that limits an output of an image or an audio including information whose reproduction may be limited. The contents inquiry prohibition mode may represent a mode that prevents limited contents from being retrieved. The haptic feedback mode may represent a mode that provides, for example, haptic feedback to a user or a third party, and the electronic device itself may provide the haptic feedback. Also, a signal for generating haptic feedback may be transferred to an electronic device of a third party via a wired line or wirelessly. Assuming a circumstance of determining that the user is a minor and the electronic device, for example, reproduces limited contents having sexuality, the electronic device may enter a turn-off mode or a sleep mode so that the contents may not be reproduced, or may replace information whose reproduction may be limited by a different image or different text and output the same.

For another example, in a case of determining a user whose reproduction of limited contents having sexuality is limited, the electronic device may enter the turn-off mode or the sleep mode so that the contents may not be reproduced, or may replace information whose reproduction may be limited by a different image or different text and output the same.

For still another example, in a case of determining a user who is not registered as a user who is allowed to reproduce limited contents having sexuality, the electronic device may process to limit an output of the contents and register user information regarding the user.

The modes may be performed before reproduction and may be performed during reproduction. For example, in a case where information of a user who is not allowed or circumstance information where contents reproduction is limited is detected while a user who is allowed to reproduce contents reproduces relevant contents and views the same, one or more of relevant modes may be performed. For an embodiment, in a case where a new person's face or silhouette is detected via an image sensor or a voice of a person who is not allowed to reproduce contents is collected via a microphone device during the contents reproduction, one or more of the above modes may be performed. Also, in a case where contents are reproduced for a predetermined time or more set in advance, or reproduced in a predetermined time band, in a case where the electronic device moves into a predetermined position region, and even in a case where movement of user equipment is detected by a predetermined reference distance or angle or more via an acceleration sensor or a geomagnetic sensor, one or more of the above modes may be performed.

Figure 3:
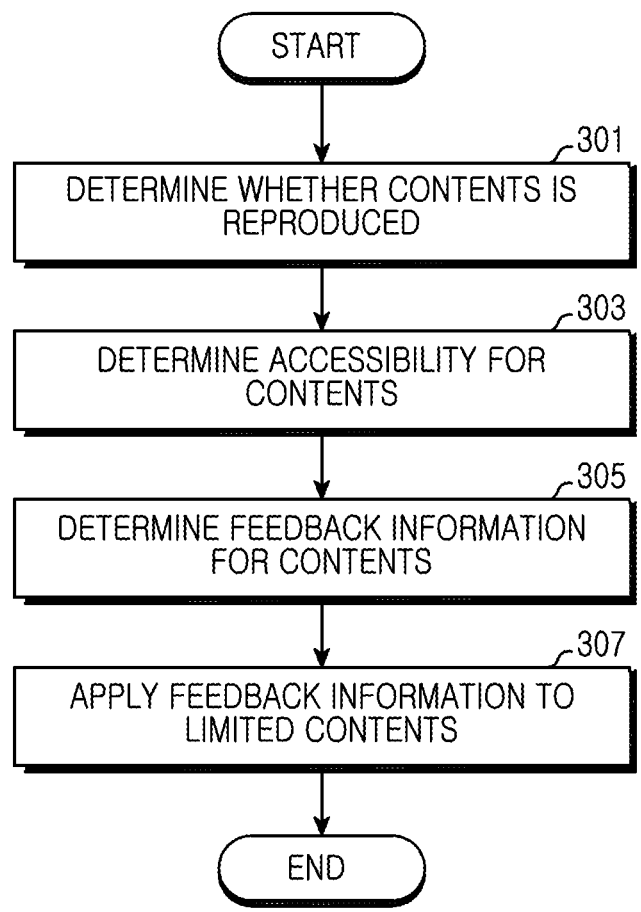
FIG. 3 is a flowchart illustrating a contents reproduction operation of an electronic device according to an embodiment of the present disclosure.

FIG. 3 is a flowchart illustrating a contents reproduction operation of an electronic device according to an embodiment of the present disclosure.

Referring to FIG. 3, contents are digital contents that may be reproduced in an electronic device, and may include a movie, music, games, or an electronic book, etc.

The electronic device according to an embodiment of the present disclosure may reproduce contents for only an allowed user or under only an allowed environment depending on the attribute of the contents.

In addition, in a case where contents reproduction is impossible, the electronic device may perform an operation corresponding to feedback information defined in advance. The feedback information may be information regarding an operation to which the electronic device may respond with respect to limited contents. For example, in a case where contents, whose reproduction is limited or a screen of contents whose reproduction is limited, are reproduced, the feedback information may be operation information that stops an output of the screen or a sound, etc.

The feedback information may be operation information that allows to display an image, a screen, or a message defined in advance on the screen of contents whose reproduction is limited.

In a case where contents, whose reproduction is limited, are reproduced, the feedback information may be operation information that allows to enter a turn-off mode or a sleep mode.

In a case where contents, whose reproduction is limited, are reproduced, the feedback information may be operation information that allows to notify another electronic device defined in advance that limited contents are reproduced.

To perform the above operation, the electronic device may determine whether limited contents are reproduced in operation 301. The electronic device may analyze image information, sound information, text information, or additional information, etc. of contents corresponding to an input to determine whether to reproduce limited contents.

The electronic device may determine accessibility of limited contents in operation 303. The operation may be an operation that determines user information of a user who intends to reproduce contents, and contents reproduction environment information. For example, the electronic device may determine whether a user who intends to reproduce contents is a user who is allowed for reproduction of limited contents, whether an area where limited contents are to be reproduced is an allowed area, or whether an environment is a circumstance where contents reproduction is allowed.

For example, the electronic device may determine whether a user's image obtained via an image sensor or a user's voice obtained via a microphone coincides with information stored in advance to determine whether a user is a user who is allowed for contents reproduction.

For another example, the electronic device may determine a user's age using a user's image obtained via an image sensor or a user's voice obtained via a microphone to determine whether a user is a user who is allowed for contents reproduction.

For still another example, the electronic device may determine a current position using GPS information or base station information, etc., and determine whether the current position is a position suitable for reproduction of limited contents. The electronic device may determine a position suitable for reproduction of limited contents to compare the position with a current position. In addition, the electronic device may determine a current position to determine whether content whose reproduction is limited at the current position is included in limited contents.

The electronic device may determine feedback information regarding limited contents based on user information or environment information in operation 305. The feedback information means operation information of the electronic device to respond to a user who reproduces limited contents, and may be operations such as a turn-off mode for the electronic device, an image replacement mode, a sleep mode, a text message output mode, a message transmission mode to another device, a contents inquiry prohibition mode, or an output limit mode, etc.

The electronic device may apply feedback information to limited contents based on user information or environment information in operation 307.

For example, in a case where the limited contents are reproduced by an un-allowed user or an un-allowed position or environment, etc., the electronic device may perform operations such as a turn-off mode for the electronic device, an image replacement mode, a sleep mode, a text message output mode, a message transmission mode to another device, a contents inquiry prohibition mode, an output limit mode, or a haptic feedback mode, etc.

Figure 4:
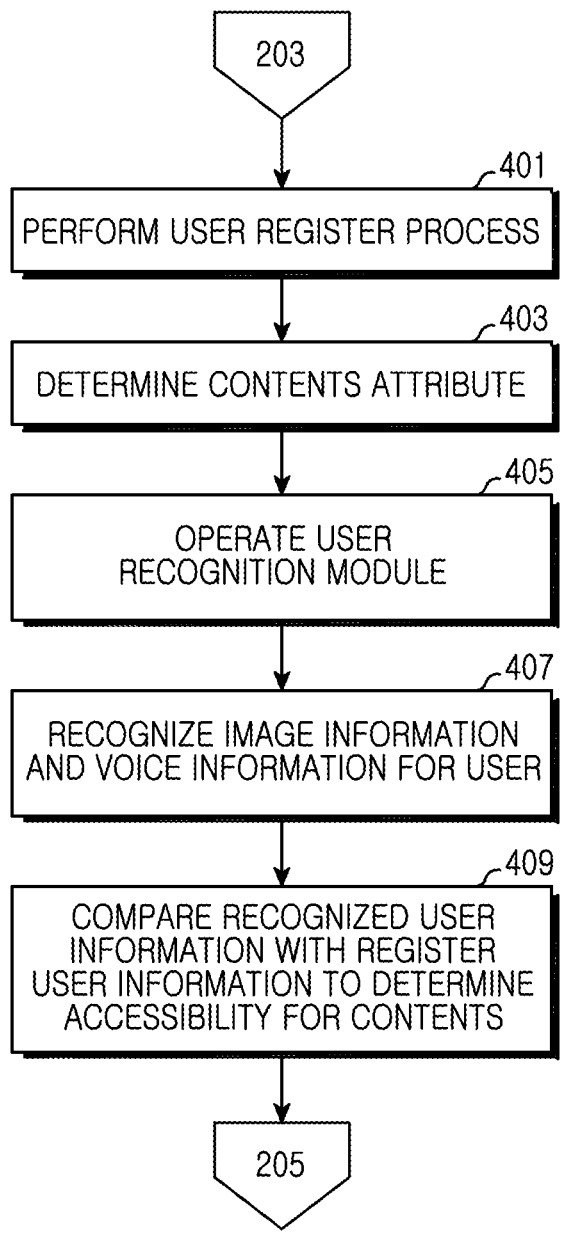
FIG. 4 is a flowchart illustrating an operation of determining accessibility for contents of an electronic device according to an embodiment of the present disclosure.

FIG. 4 is a flowchart illustrating an operation of determining accessibility for contents of an electronic device according to an embodiment of the present disclosure.

Referring to FIG. 4, an electronic device may determine accessibility of contents for a user using information of a user defined in advance.

After operation 203, as illustrated in FIG. 2, the electronic device may perform a user register operation (process) in operation 401.

The electronic device may be controlled by a plurality of users. For example, an electronic device such as a PC or a smartphone, etc. may be controlled by other family members. In this case, the electronic device may store a user who is allowed to access contents, a user whose access to contents is limited, or feedback information regarding contents, etc. using information such as voice or an image, etc.

The electronic device may store an image or voice of a user who is allowed to access contents or whose access to the contents is limited, and may additionally store a name, a birth date, an age, or the type of accessible contents, etc. with respect to each user.

For example, in a case where limited contents are reproduced, the electronic device may store feedback information that limits screen output with respect to a user A. In addition, the electronic device may additionally store information that will limit reproduction of violent contents with respect to the user A. At this point, when a user registration operation is executed, the electronic device may operate a module that may receive user information such as a microphone or an image sensor, etc. The electronic device may use user information stored in advance (e.g., advance user information).

To register a user, the electronic device may perform a face recognition operation for an image shot via an image sensor and an image stored in advance, and receive a user to register among recognized faces. To determine whether to allow an access to limited contents, the electronic device may recognize not only a user's face but also a specific body portion (e.g., iris recognition, fingerprint recognition, hair style recognition, etc.).

In addition, the electronic device may determine the attribute of reproduction contents in operation 403.

The electronic device may operate a user recognition module in operation 405.

The electronic device may operate the user recognition module in order to determine whether a user is a user who is allowed to access contents or a user whose access to contents is limited. The user recognition module may include a microphone that recognizes a user's voice, an image sensor that may shoot a user's face, a fingerprint sensor or an iris recognition sensor, etc.

The electronic device may recognize information such as an image, voice, an iris or a fingerprint, etc. of a user using the user recognition module in operation 407.

The electronic device may compare recognized information of the user with setting information (e.g., register user information) of a user registered in advance to determine whether the user is accessible to contents in operation 409, and then continue to operation 205, as illustrated in FIG. 2.

Figure 5:
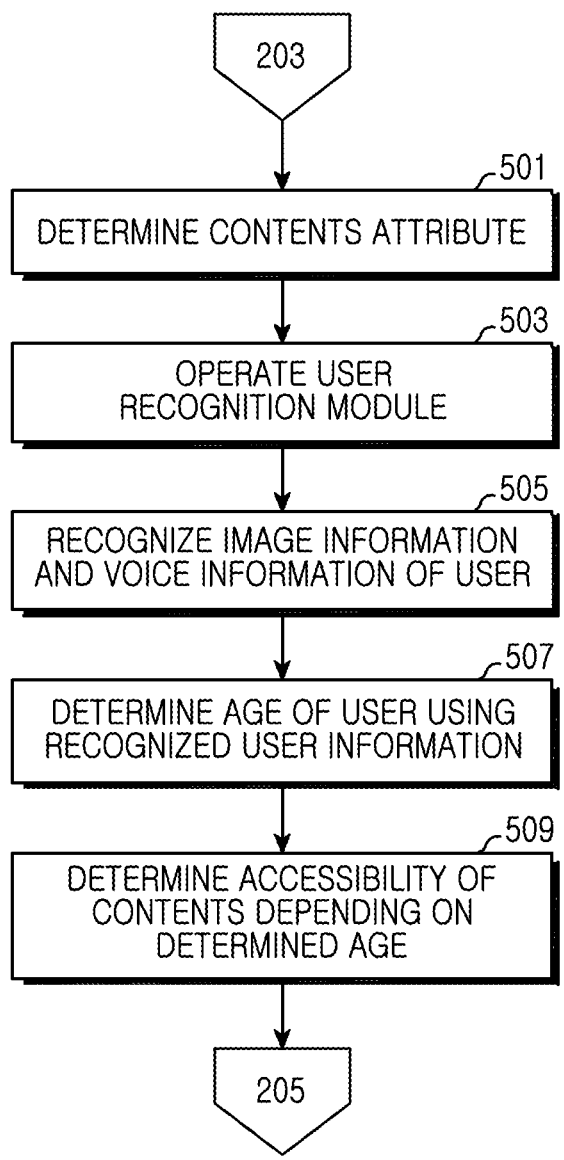
FIG. 5 is a flowchart illustrating an operation of determining accessibility for contents of an electronic device according to an embodiment of the present disclosure.

FIG. 5 is a flowchart illustrating an operation of determining accessibility for contents of an electronic device according to an embodiment of the present disclosure.

Referring to FIG. 5, an electronic device may determine an age group of a user who reproduces contents to determine accessibility of contents with respect to a user.

After operation 203, as illustrated in FIG. 2, the electronic device may determine the attribute of reproduction contents in operation 501.

The electronic device may operate the user recognition module in operation 503.

The electronic device may recognize image information (e.g., a face, a hair style, a fingerprint, a clothes style, etc.) or voice information of a user using, for example, the user recognition module in operation 505.

The electronic device may determine an age group of a user using the recognized information of the user in operation 507.

The electronic device may determine accessibility of contents depending on the determined age group in operation 509 and then continue to operation 205, as illustrated in FIG. 2.

Figure 6:
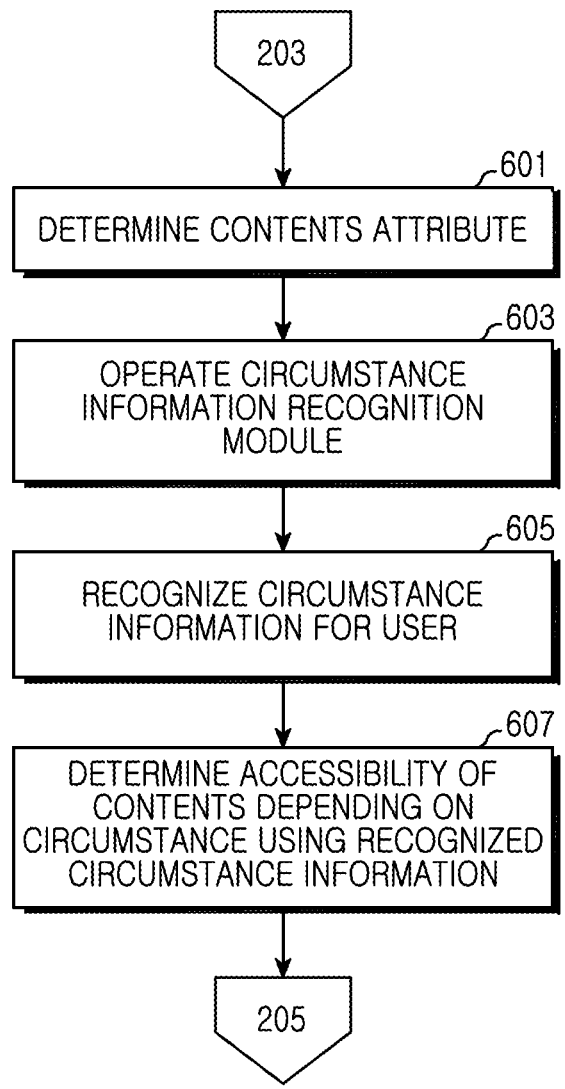
FIG. 6 is a flowchart illustrating an operation of determining accessibility for contents of an electronic device according to an embodiment of the present disclosure.

FIG. 6 is a flowchart illustrating an operation of determining accessibility for contents of an electronic device according to an embodiment of the present disclosure.

Referring to FIG. 6, an electronic device may determine accessibility of contents with respect to a user using environment information. The environment information may mean information such as an area or a circumstance where limited contents may be reproduced.

After operation 203, as illustrated in FIG. 2, the electronic device may determine the attribute of reproduction contents in operation 601.

The electronic device may operate a module (e.g., a circumstance information recognition module) that may recognize, for example, environment information in operation 603.

The electronic device may recognize the environment information (e.g., circumstance information) via, for example, the operated module in operation 605. For example, the electronic device may determine whether a user is positioned in an area where limited contents may be reproduced, or whether an environment is a circumstance where limited contents may be reproduced.

The electronic device may determine accessibility of contents depending on the environment information (e.g., a circumstance) using the recognized environment (e.g., circumstance) information in operation 607 and then continue to operation 205, as illustrated in FIG. 2.

Figure 7:
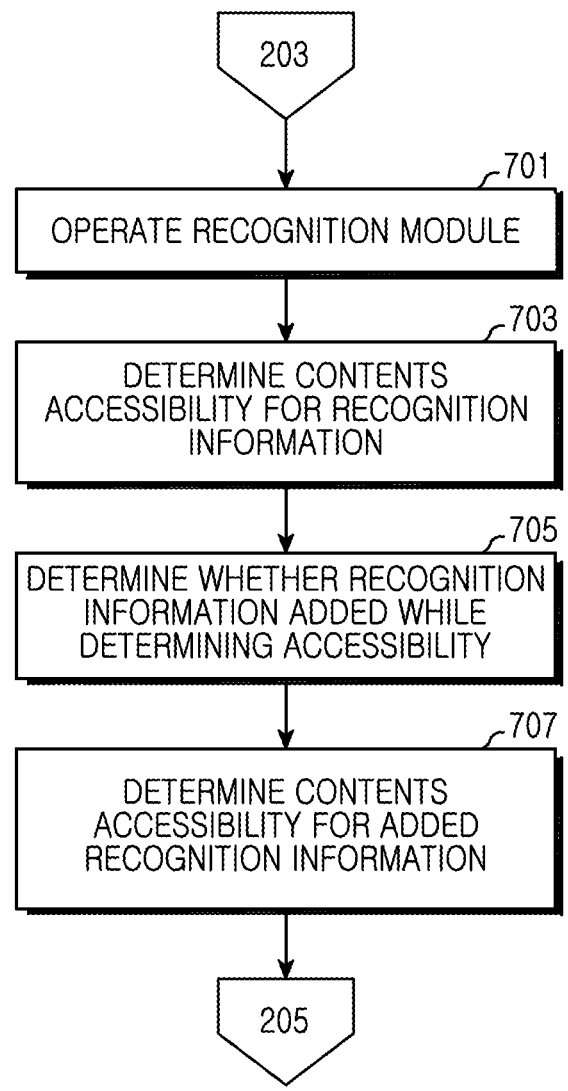
FIG. 7 is a flowchart illustrating an operation of determining accessibility for contents of an electronic device according to an embodiment of the present disclosure.

FIG. 7 is a flowchart illustrating an operation of determining accessibility for contents of an electronic device according to an embodiment of the present disclosure.

Referring to FIG. 7, an electronic device may determine accessibility of contents using information of a user defined in advance, an age group of a user, or environment information, etc.

After operation 203, as illustrated in FIG. 2, the electronic device may operate a recognition module for recognizing user information and environment information in operation 701.

The electronic device may determine accessibility of contents using information (e.g., recognition information) recognized via the operated recognition module in operation 703.

The electronic device may determine whether recognition information is newly added or recognition information changes while determining accessibility in operation 705.

The electronic device may determine a circumstance of the electronic device changes. For example, the electronic device may determine whether a circumstance of the electronic device that moves on foot changes to a circumstance of the electronic device that moves in a vehicle.

The electronic device may determine contents accessibility for added or changed recognition information in operation 707 and then continue to operation 205, as illustrated in FIG. 2.

For example, in a case where a plurality of users is detected during a user recognition operation, the electronic device may perform an authentication operation for all users. In addition, in a case where a new user is detected during an authentication operation, the electronic device may perform an authentication operation even on the newly detected user.

Figure 8A:
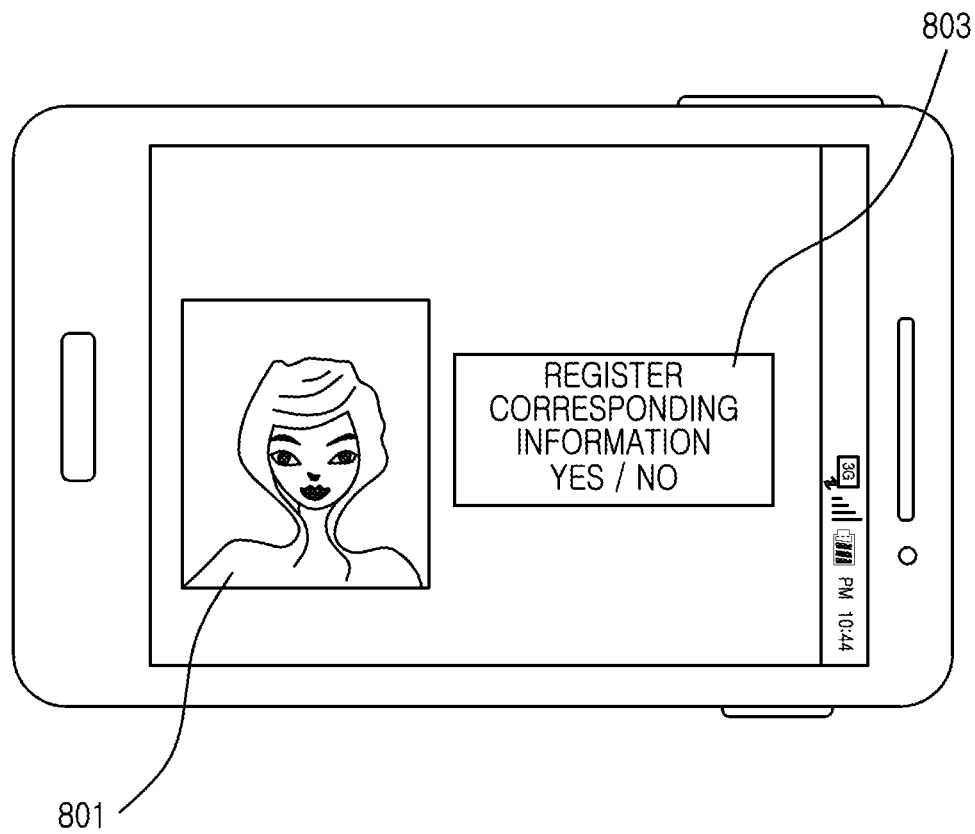
FIGS. 8A and 8B illustrate an operation of registering a user, for determining accessibility for contents in an electronic device according to various embodiments of the present disclosure.
Figure 8B:
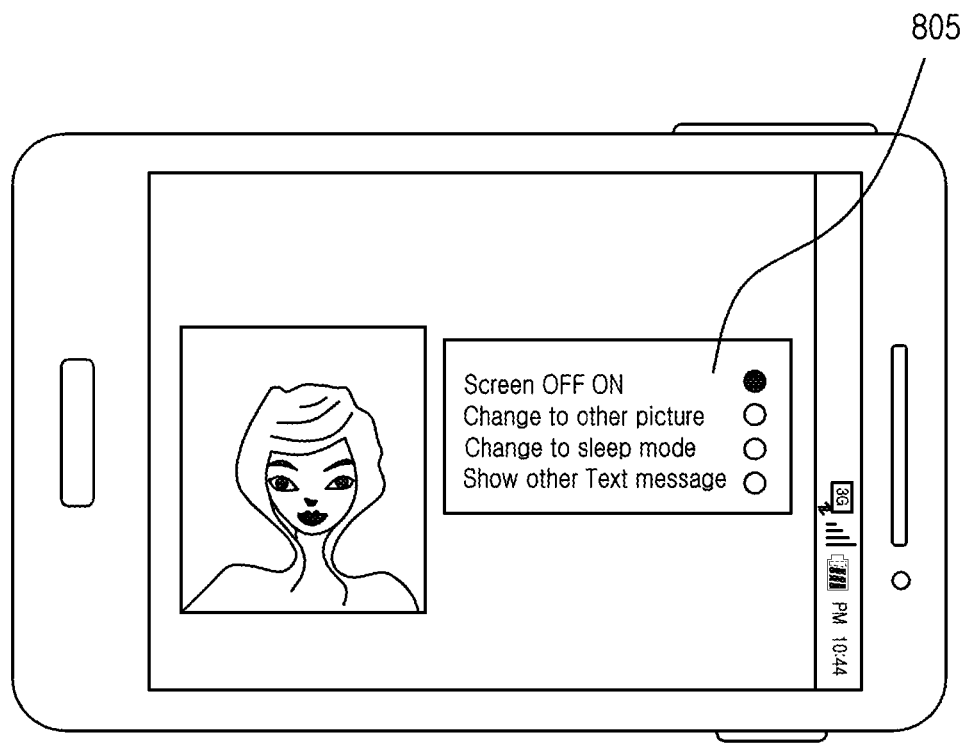

FIGS. 8A and 8B illustrate an operation of registering a user, for determining accessibility for contents in an electronic device according to an embodiment of the present disclosure.

Referring to FIGS. 8A and 8B, an electronic device may register a user whose access to contents is limited or a user who is allowed to access contents.

At this point, the electronic device may register a user who may access contents or a user whose access to contents is limited using an image obtained via an image sensor or an image stored in advance.

The electronic device may further add not only a user's image but also a name, a birth date, an age, the type of access limited contents, or feedback information for access limited contents, etc.

The electronic device may replace access limited contents (scene corresponding to access limit) by a different image or message, or add feedback information for a method limiting contents reproduction, etc.

For example, as illustrated in FIG. 8A, the electronic device may recognize a user from a displayed image 801, and then display a menu 803 that allows to register feedback information with respect to the recognized user.

At this point, the electronic device may recognize a face included in a displayed image, and display a recognition result. After that, the electronic device may allow a user to register to be selected from displayed recognition results.

The electronic device may detect an input (e.g., a drag input) for a displayed image to determine a facial region, and register the determined face. Though a circumstance of recognizing a user's face in order to register feedback information has been illustrated in the illustrated drawing, the electronic device may recognize a specific body portion (e.g., iris recognition, fingerprint recognition, hair style recognition, etc.).

When an input for registering feedback information for a recognized face is detected, the electronic device may display a screen for setting feedback information 805 for contents as illustrated in FIG. 8B.

The above registered user information or feedback information may be changed after, for example, a predetermined authentication operation has been performed.

FIGS. 9A to 9D illustrate an operation of reproducing contents in an electronic device according to an embodiment of the present disclosure.

The electronic device may be controlled by a plurality of users.

The electronic device may store information regarding a user who may access contents or feedback information regarding contents to prevent contents from being reproduced by an un-allowed user.

The electronic device may process limited contents so that the limited contents are not reproduced for an un-allowed user or may limit an output of a screen or an audio with respect to content corresponding to the limited contents.

Figure 9A:
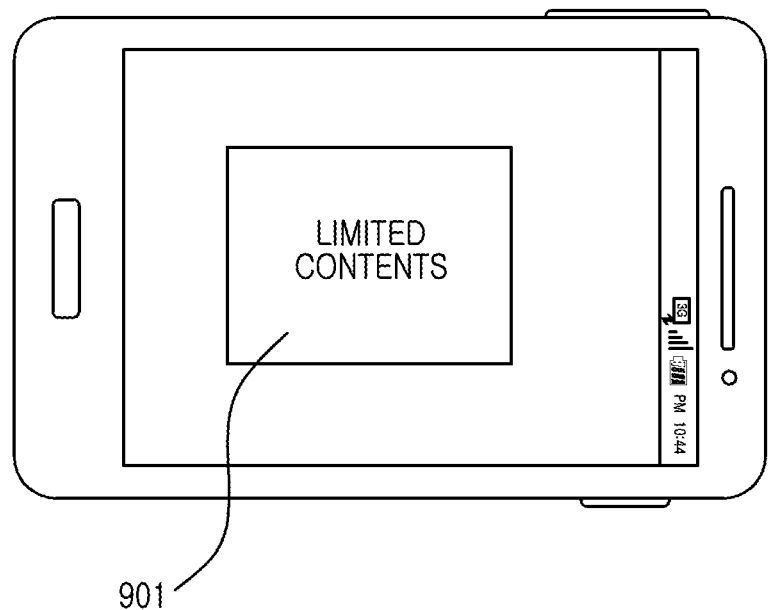
FIGS. 9A, 9B, 9C and 9D illustrate an operation of reproducing contents in an electronic device according to various embodiments of the present disclosure.

For example, the electronic device may understand the attribute of contents to determine whether limited contents 901 are reproduced as illustrated in FIG. 9A.

When determining whether the limited contents are reproduced, the electronic device may obtain user information and environment information.

When user information or environment information where limited contents may be reproduced is determined, the electronic device may reproduce the limited contents.

Meanwhile, when user information or environment information where limited contents cannot be reproduced is determined, the electronic device may determine feedback information which is operation information of the electronic device for responding to a user who reproduces limited contents.

Figure 9B:
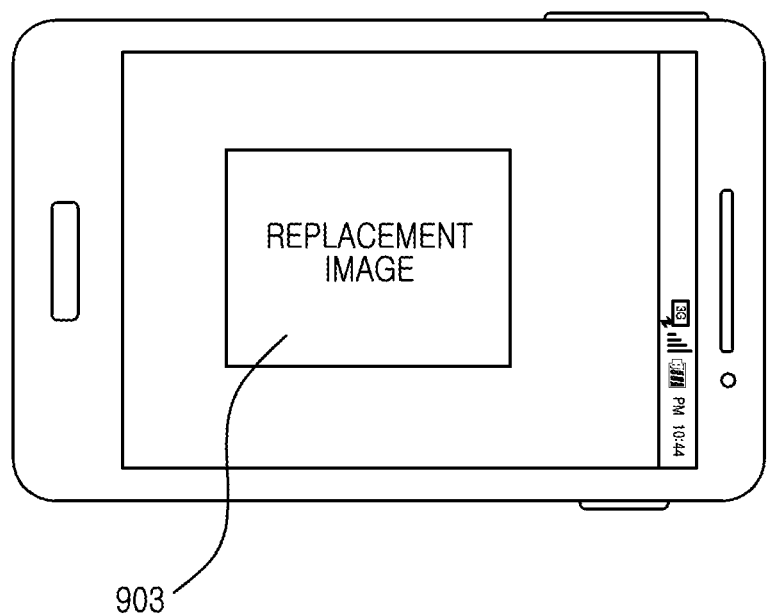

For example, when determining an image replacement mode as feedback information for limited contents, the electronic device may replace limited contents by a different image 903 (e.g., a replacement image) and output the same as illustrated in FIG. 9B. At this point, the electronic device may overlay the replacement image onto limited contents to allow the limited contents not to be displayed to an un-allowed user. For one embodiment, the electronic device may hide, for example, a screen of sexuality or violence with a replacement image such as a mosaic screen.

Figure 9C:
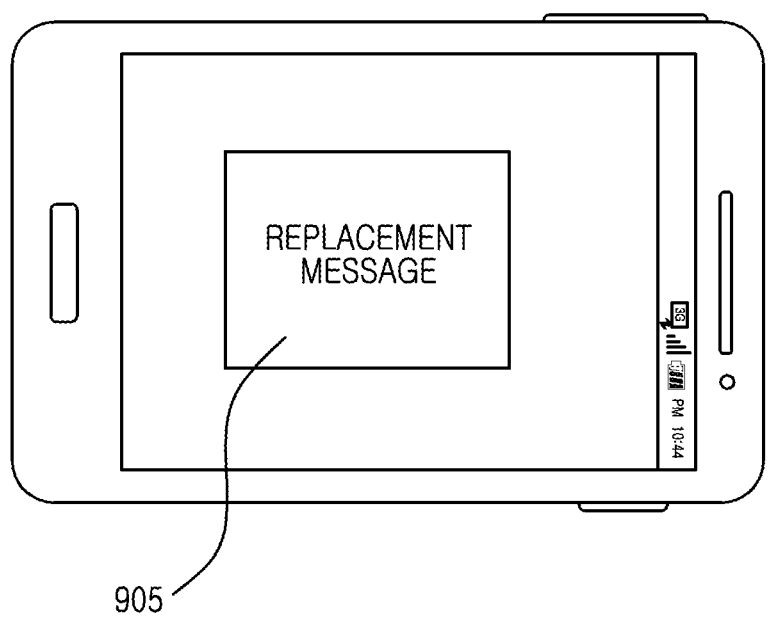

For another example, when determining a text message output mode as feedback information for limited contents, the electronic device may replace the limited contents by a different message 905 (e.g., a replacement message) and output the same as illustrated in FIG. 9C. The electronic device may overlay a replacement message onto the limited contents to allow the limited contents not to be displayed to an un-allowed user. For one embodiment, the electronic device may hide a screen of sexuality or violence with a message informing view limitation, or replace a line having abuse by a rarified line, or replace a line having abuse by a proverb or saying, etc., and display the same.

Figure 9D:
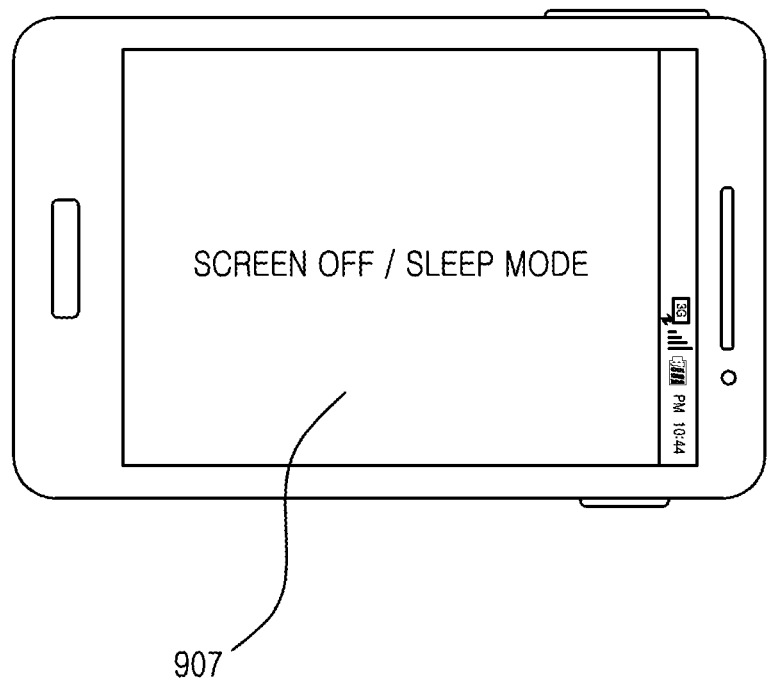

For another embodiment, when determining an output limit mode or a sleep mode as feedback information for limited contents, the electronic device may stop a screen output (e.g., screen off) or enter a sleep mode 907 as illustrated in FIG. 9D. For example, in a case where limited contents are reproduced, the electronic device may prevent the limited contents from being reproduced by stopping the rest of functions except a communication module. In addition, the electronic device may perform a predetermined authentication operation and then release the sleep mode.

FIGS. 10A to 10D illustrate an operation of reproducing contents in an electronic device according to an embodiment of the present disclosure.

Referring to FIGS. 10A to 10D, an electronic device may display a web page, and the web page may include an object (i.e., an advertisement) including sexuality.

Figure 10A:
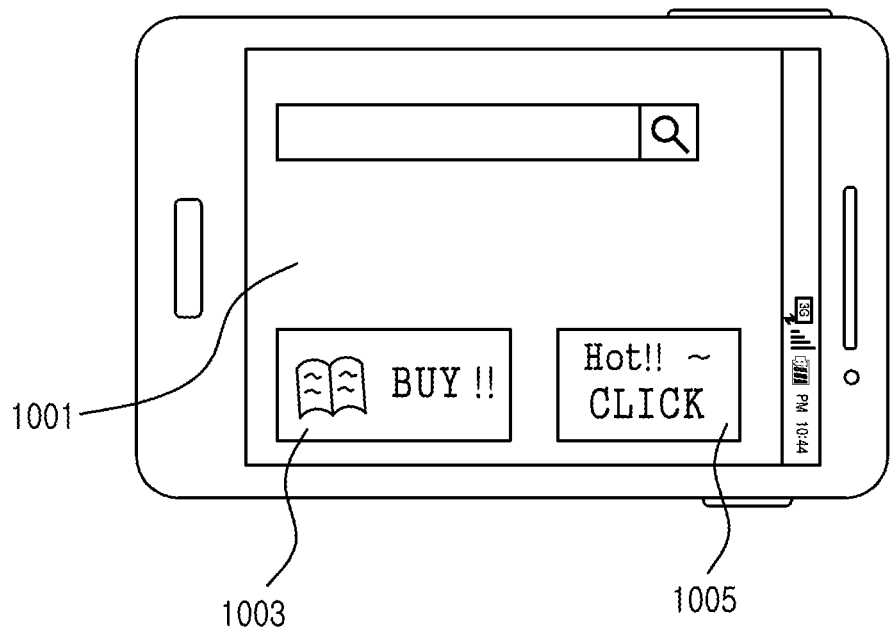
FIGS. 10A, 10B, 10C and 10D illustrate an operation of reproducing contents in an electronic device according to various embodiments of the present disclosure.

For example, as illustrated in FIG. 10A, the electronic device may display a web screen where a plurality of pages are linked.

The drawing of FIG. 10A shows a web screen 1001 providing a retrieve function, and includes an advertisement 1003 of pages purchasable as a book and an advertisement 1005 that links a page including sexuality.

Recently, the electronic device may be controlled by a plurality of users, and so an advertisement including sexuality may be exposed to children. To prevent this, the electronic device may understand the attribute of a displayed web screen to determine whether the web screen corresponds to limited contents.

When determining a web screen corresponding to limited contents, the electronic device may determine user information or environment information. For example, the electronic device may determine whether a user is a user who is allowed to access a web screen corresponding to limited contents or an environment is a circumstance where the user is allowed to access the web screen.

When determining user information or environment information that may display a web screen corresponding to limited contents, the electronic device may output a web screen corresponding to the limited contents.

Meanwhile, when determining user information or environment information that cannot display a web screen corresponding to limited contents, the electronic device may determine feedback information which is operation information of the electronic device, for responding to a user who reproduces the limited contents.

The electronic device may prevent an advertisement that links a page including sexuality from being displayed.

The electronic device may receive a document written with a markup language such as HTML to display a web page via a browser, and edit an HTML document to prevent an advertisement of sexuality from being displayed.

Figure 10B:
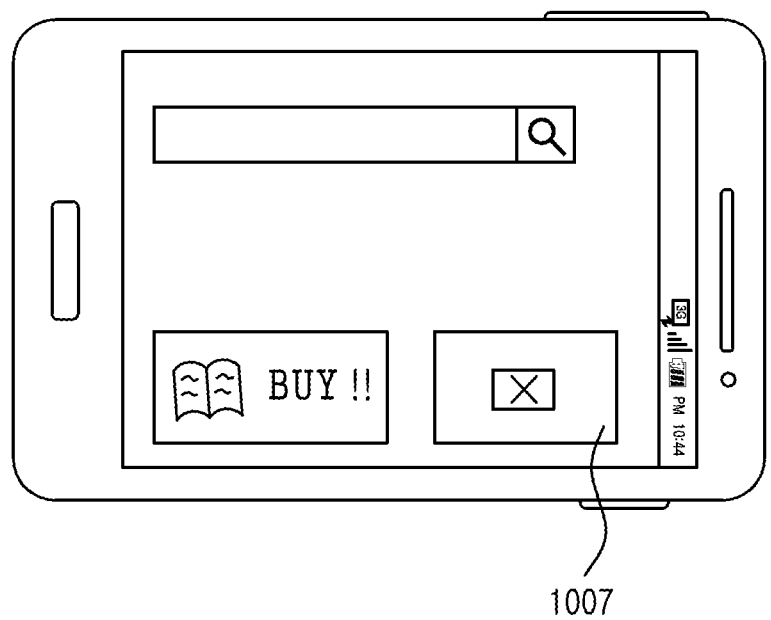

For example, the electronic device may process to edit an HTML document 1007 so that a link of an advertisement of sexuality may not be output as illustrated in FIG. 10B.

Figure 10C:
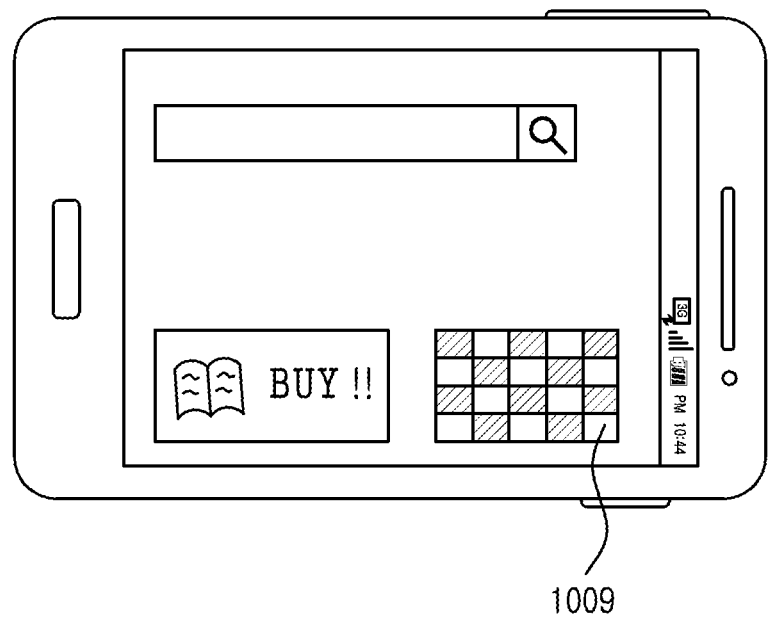

For another example, the electronic device may process to edit an HTML document so that an image defined in advance 1009 may be overlaid onto an advertisement that links a page including sexuality and displayed as illustrated in FIG. 10C.

The drawing of FIG. 10C illustrates a circumstance of processing to add a mosaic image to an advertisement including sexuality so that sexual content may not be displayed.

Figure 10D:
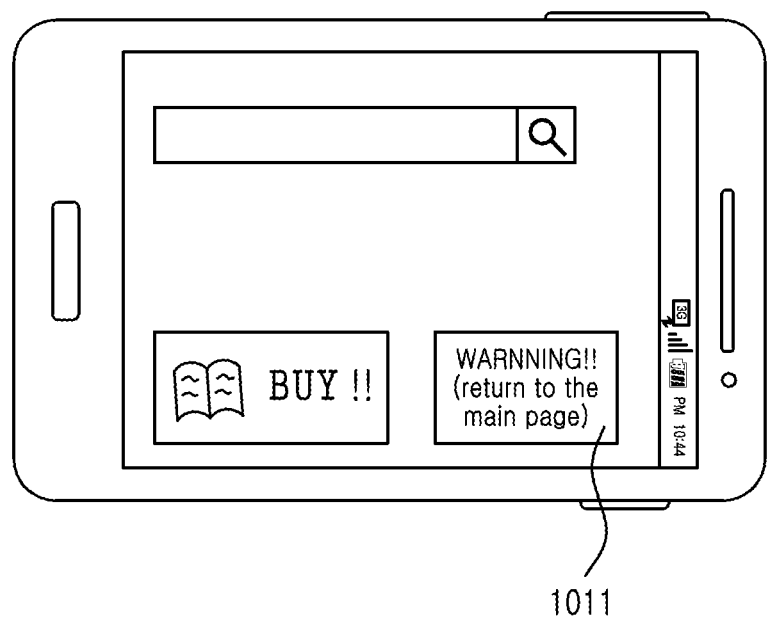

For another example, the electronic device may process to edit an HTML document so that a message defined in advance may overlap an advertisement that links a page including sexuality and may be displayed as illustrated in FIG. 10D.

The drawing of FIG. 10D illustrates a circumstance of processing to add a warning message 1011 instead of an advertisement including sexuality so that sexual content may not be displayed. In addition, the electronic device may process to edit an HTML document and move to a main page of a relevant site in a case where a sexual advertisement is clicked.

Figure 11A:
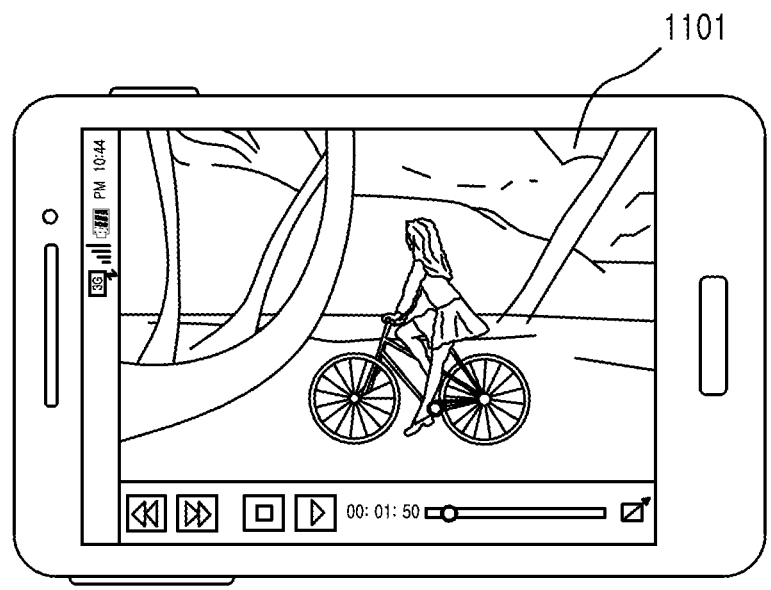
FIGS. 11A, 11B and 11C illustrate an operation of reproducing contents in an electronic device according to various embodiments of the present disclosure.
Figure 11B:
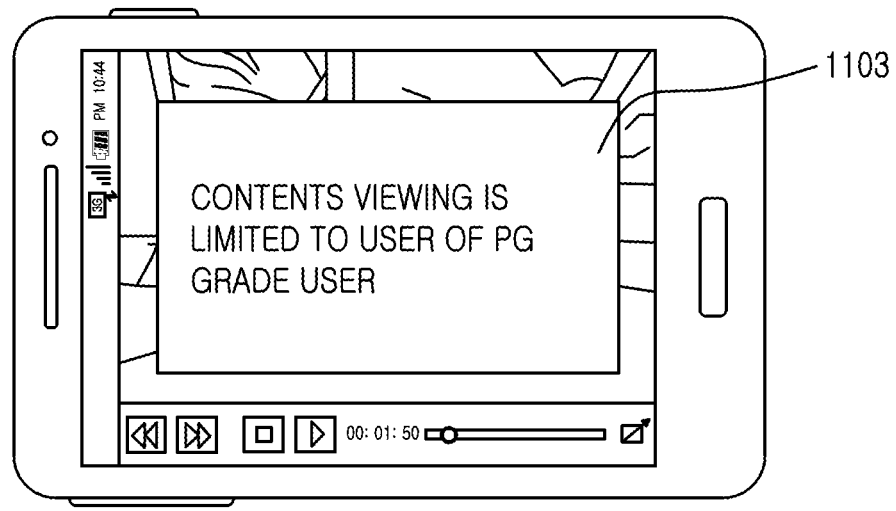
Figure 11C:
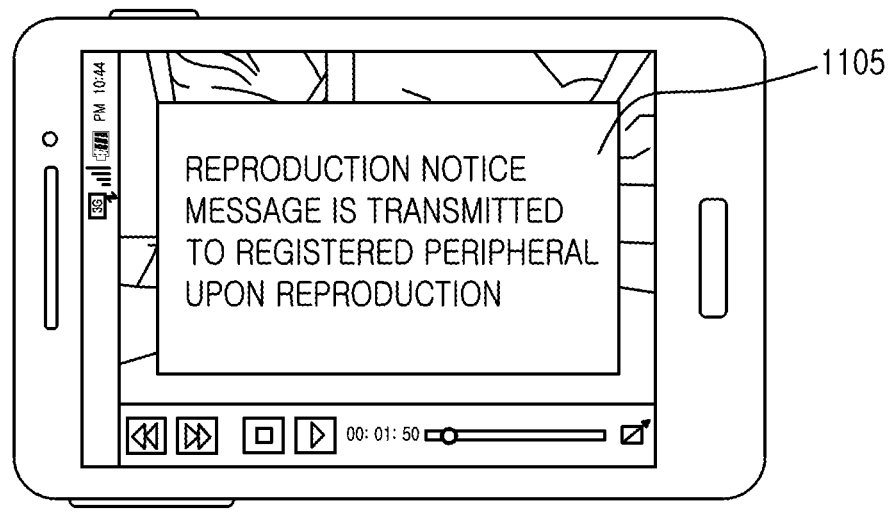

FIGS. 11A to 11C illustrate an operation of reproducing contents in an electronic device according to an embodiment of the present disclosure.

Referring to FIGS. 11A to 11C, an electronic device may reproduce moving picture contents 1101 as illustrated in FIG. 11A. The contents may include a scene whose reproduction is limited such as sexuality, violence, a religious or cultural taboo, etc.

The electronic device may understand the attribute of contents to determine whether a scene whose reproduction is limited exists.

In a case of determining contents including a scene whose reproduction is limited, the electronic device may determine user information or environment information. Also, the electronic device may determine whether to reproduce the contents based on at least one of the user information and the environment information.

For example, the electronic device may display a message 1103 informing an access limit instead of a scene whose reproduction is limited as illustrated in FIG. 11B.

For another example, in a case where a scene whose reproduction is limited is reproduced, the electronic device may display a message 1105 informing other neighbor peripheral devices that contents whose access is limited is reproduced as illustrated in FIG. 11C.

Figure 12A:
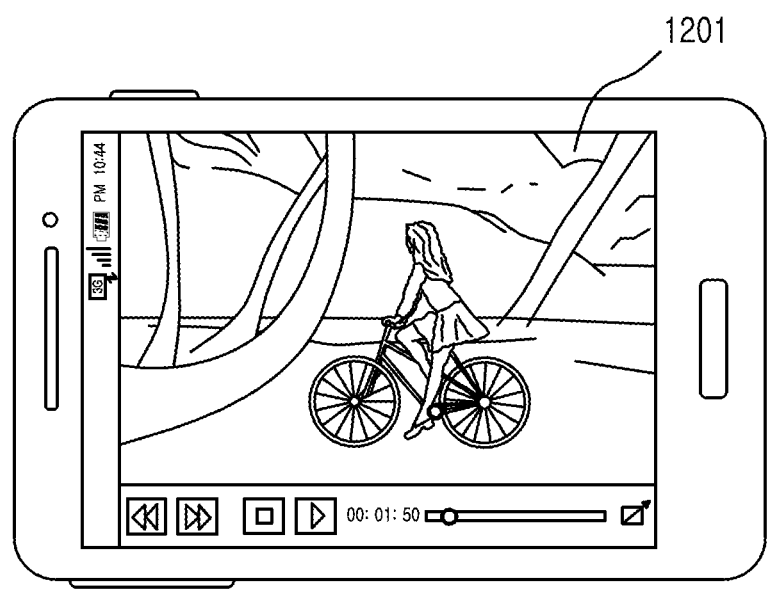
FIGS. 12A, 12B and 12C illustrate an operation of reproducing contents in an electronic device according to various embodiments of the present disclosure.
Figure 12B:
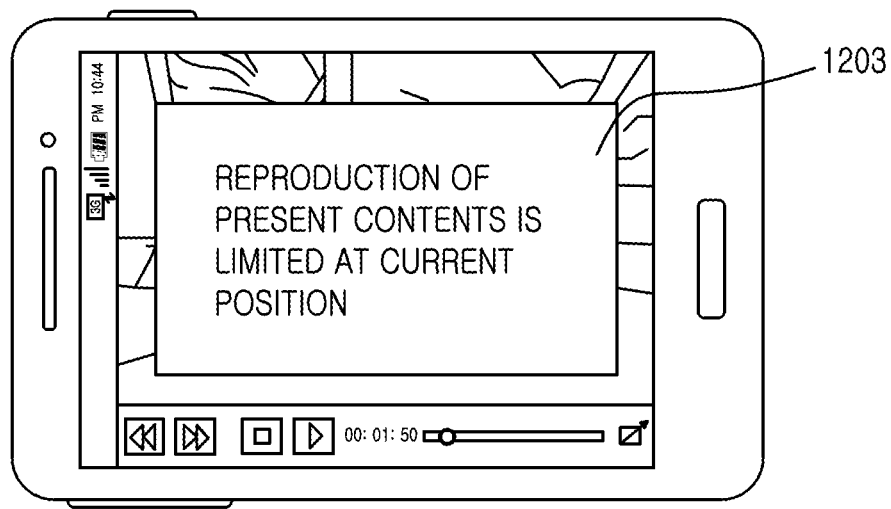
Figure 12C:
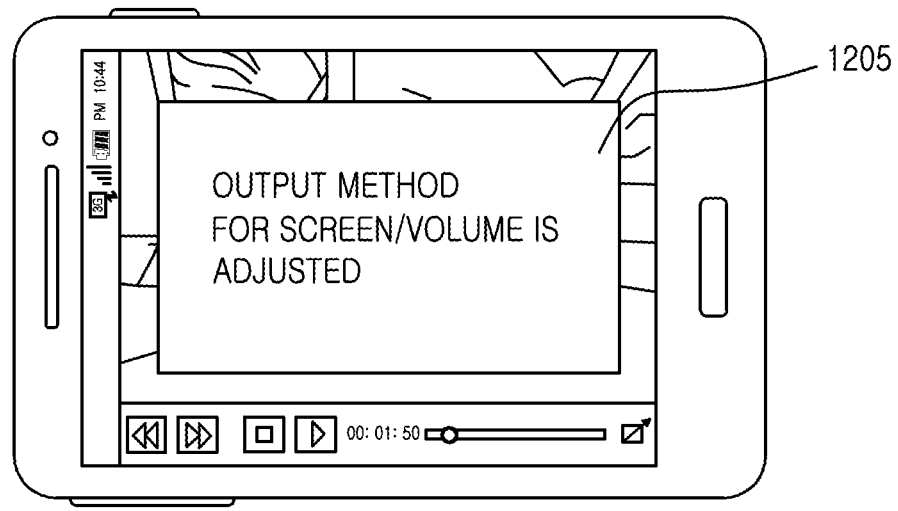

FIGS. 12A to 12C illustrate an operation of reproducing contents in an electronic device according to an embodiment of the present disclosure.

Referring to FIGS. 12A to 12C, an electronic device may reproduce moving picture contents 1201 as illustrated in FIG. 12A. The contents may include a scene whose reproduction is limited such as sexuality, violence, a religious or cultural taboo, etc.

The electronic device may understand the attribute of contents to determine whether a scene whose reproduction is limited exists.

In q case of determining contents including a scene whose reproduction is limited, the electronic device may determine user information and/or environment information to determine whether to reproduce the contents.

For example, in a case of determining that the contents cannot be reproduced based on environment information, the electronic device may display a message 1203 informing that reproduction of the contents is limited based on the environment information (e.g., current position) as illustrated in FIG. 12B.

For example, in a case of determining that a user is positioned at a public place such as an office or school, etc., the electronic device may output a message of content that reproduction of contents including a scene whose reproduction is limited is limited.

For another example, in a case of determining that the contents cannot be reproduced based on environment information, the electronic device may adjust an output method of contents 1205 including a scene whose reproduction may be limited as illustrated in FIG. 12C.

For example, in a case of determining a circumstance of a user who moves in a public place, the electronic device may prevent a scene whose reproduction is limited from being displayed, and process to lower an audio volume or allow the scene to be output only in an earphone mode.

In a case of determining a user positioned in a nation that allows only a specific religion, the electronic device may prevent contents for different religions from being reproduced at a relevant position.

In a case where contents related to violence, sexuality, a religious or cultural taboo are reproduced inside home, the electronic device may stop reproduction of the contents.

Figure 13:
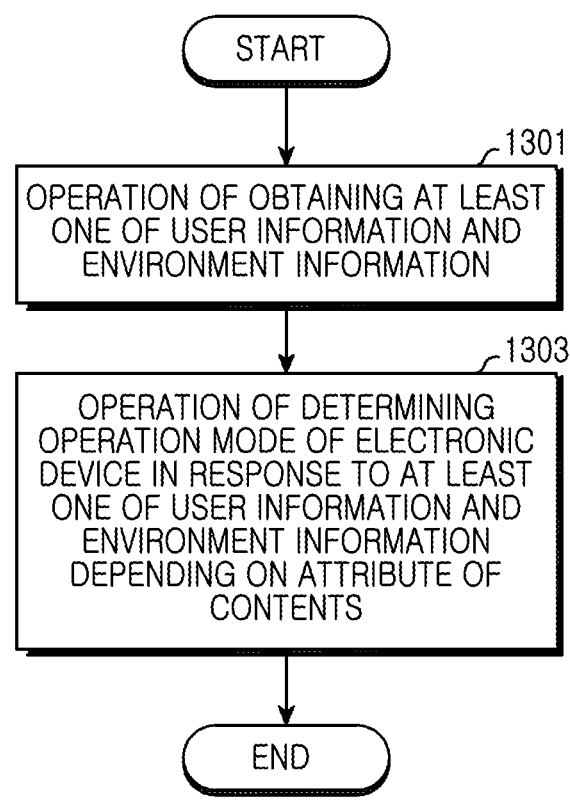
FIG. 13 is a flowchart illustrating an operation of reproducing contents in an electronic device according to the present disclosure.

FIG. 13 is a flowchart illustrating an operation of reproducing contents in an electronic device according to the present disclosure.

Referring to FIG. 13, an electronic device may perform an operation of obtaining at least one of user information and environment information in operation 1301, and perform an operation of determining an operation mode of the electronic device in response to at least one of the user information and the environment information depending on the attribute of the contents in operation 1303.

The operation that determines the operation mode may include an operation that determines an operation of the electronic device corresponding to the user information using at least one of real-time user information and user information stored in advance (e.g., advance user information).

The operation that determines the operation mode may include an operation that determines whether the user information is authenticated in response to the attribute of the contents. The operation that determines whether the user information is authenticated may include an operation that determines whether the user information is authenticated using at least one of user setting information including information regarding an operation mode of the electronic device, and an image or voice obtained via a recognition module. The operation that determines whether the user information is authenticated may further include an operation that determines an operation mode of the electronic device in response to a result of the authentication result.

In a case of obtaining a plurality of user information, the operation that determines whether the user information is authenticated determines a plurality of authentication results for the plurality of user information. In a case where at least one of the plurality of authentication results is not suitable for an output of the contents, the operation that determines whether the user information is authenticated may include an operation of controlling the electronic device to operate in at least one of a turn-off mode for at least one electronic device, an image replacement mode, a sleep mode of the electronic device, a text message output mode, a message transmission mode to another device, a contents inquiry prohibition mode, a low specification mode for at least one unit of the electronic device.

The operation that determines the operation mode may include an operation that analyzes the attribute of the contents during an operation of the contents or before the operation of the contents.

According to an embodiment of the present disclosure, a method for providing, at an electronic device, contents may include an operation of determining the attribute of the contents, an operation of obtaining at least one of user information and environment information in a case where reproduction of the contents is limited based on the attribute of the contents, and an operation of controlling a reproduction method of the contents in response to the user information or the environment information.

According to an embodiment, at least a portion of an apparatus (e.g., modules or functions) or a method (e.g., operations) according to the present disclosure may be implemented as, for example, an instruction stored in a computer-readable storage media in the form of a programming module. The instruction, when executed by one or more processors (e.g., the processor 122), allows the processor 122 to perform a function corresponding to the instruction. The computer-readable storage medium may be, for example, the memory 110. At least a portion of the programming module may be implemented (e.g., executed), for example, by the processor 122. At least a portion of the programming module may include, for example, a module, a program, a routine, sets of instructions, or a process, etc. for performing one or more functions.

The computer-readable recording medium may include a hardware device specially configured to store and perform a program instruction (e.g., a programming module) such as a hard disk, a floppy disk, a magnetic media such as a magnetic tape, an optical media such as Compact Disc-Read Only Memory (CD-ROM) and a Digital Versatile Disc (DVD), a magneto-optical media such as a floptical disk, and Read Only Memory (ROM), Random Access Memory (RAM), a flash memory, etc. Also, the program instruction may include not only a machine language code such as things generated by a compiler but also a high level language code that may be executed by a computer using an interpreter, etc. The above-described hardware device may be configured to operate as one or more software modules in order to perform an operation of the present disclosure, and vice versa.

A module or a programming module according to the present disclosure may include at least one of the above-described elements, or some of the elements may be omitted, or may further include additional other elements. Operations performed by a module, a programming module, or other elements may be executed by a sequential, parallel, repetitive, or heuristic method. Also, some of the operations may be executed in a different sequence, or omitted, or another operation may be added.

According to an embodiment, in a storage medium storing instructions, the instructions, when executed by at least one processor, are set to allow the at least one processor to perform at least one operation. The at least one operation may include an operation of obtaining at least one of user information and environment information, and an operation of determining an operation mode of the electronic device in response to at least one of the user information and the environment information depending on the attribute of the contents. According to an embodiment, the at least one operation may include an operation of determining the attribute of the contents, an operation of obtaining at least one of user information and environment information in a case where reproduction of the contents is limited based on the attribute of the contents, and an operation of controlling a reproduction method of the contents in response to the user information or the environment information.

An embodiment of the present disclosure may prevent limited contents from being reproduced by an un-allowed user by controlling reproduction of the contents based on user information or environment information in an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display device configured to reproduce contents;
a sensor configured to obtain at least one of user information and environment information; and
a processor configured to:
determine whether contents which a user intends to reproduce are limited contents based on an attribute of the contents, and
in response to determining that the contents are limited, determine if the user information indicates an allowed user or determine if the environment information indicates an allowed environment, and
control a limit of the contents reproduced to the user in response to at least one of the user information and the environment information.

2. The electronic device of claim 1, wherein the processor is configured to determine user setting information corresponding to the user information using at least one of real-time user information and advance user information that is stored in advance, and the user setting information comprises information regarding a reproduction mode of the contents corresponding to the user information.

3. The electronic device of claim 1, wherein the processor is configured to authenticate the user information using user setting information comprising reproduction mode information of the contents corresponding to the user information.

4. The electronic device of claim 3, wherein, when the user setting information corresponding to the user information does not exist, the processor is configured to limit an reproduction of the contents and to register the user setting information corresponding to the user information.

5. The electronic device of claim 1, wherein the processor is configured to control a reproduction of the contents based on whether the user information is authenticated.

6. The electronic device of claim 1, wherein, when the sensor obtains a plurality of user information, the processor is configured to determine a plurality of authentication results corresponding to the plurality of user information, and, when at least one of the plurality of authentication results is not suitable for providing the contents, the processor is configured to limit a reproduction of the contents.

7. The electronic device of claim 1, wherein a reproduction mode of the contents, when a reproduction of the contents is limited, comprises at least one of a turn-off mode for at least one unit of the display device, an image replacement mode, a sleep mode of the electronic device, a text message reproduction mode, a message transmission mode to another device, a contents inquiry prohibition mode, a haptic feedback mode, and a low specification mode for at least one unit of the display device.

8. The electronic device of claim 1, wherein the processor is configured to analyze the attribute of the contents during a reproduction of the contents or before the reproduction of the contents.

9. The electronic device of claim 1, wherein the processor is configured to analyze an attribute of the contents using at least one of an image analyzing method, a sound analyzing method, a text analyzing method, a method for analyzing an intro signal of an image, a method for recognizing a specific symbol, and an additional contents analyzing method.

10. The electronic device of claim 1, wherein the environment information comprises at least one of position information and circumstance information for determining a limit of a reproduction of the contents, and
wherein the circumstance information comprises at least one of a time, an ambient noise, ambient brightness, and a movement of the electronic device.

11. The electronic device of claim 1, wherein the processor is configured to determine the attribute of the contents based on at least one of: a reading grade, a religious taboo expression, a cultural taboo expression, a legal taboo expression, a violence level, a sexuality level, a specific political faction, a racially discriminative symbol, and a weapon shape.

12. The electronic device of claim 1, wherein the processor is configured to determine the attribute of the contents based on at least one of: analysis of an audio track, analysis of a subtitle file, analysis of a caption track included in the contents, analysis of meta information, analysis of a thumbnail, analysis of preview data, and analysis of pre listen data.

13. A method for providing contents in an electronic device, the method comprising:
obtaining, by the electronic device, at least one of user information and environment information;
determining whether contents which a user intends to reproduce are limited contents based on an attribute of contents; and
in response to determining that the contents are limited, determining if the user information indicates an allowed user or determining if the environment information indicates an allowed environment, and determining a limit of the contents reproduced to the user in response to at least one of the user information and the environment information.

14. The method of claim 13, wherein the determining of the reproduction of the electronic device comprises determining a reproduction mode of the electronic device corresponding to the user information using at least one of real-time user information and advance user information that is stored in advance.

15. The method of claim 13, wherein the determining of whether the user information is authenticated determines whether the user information is authenticated using at least one of user setting information comprising information regarding a reproduction mode of the electronic device, an image, and voice obtained via a recognition module.

16. The method of claim 13, wherein the determining of whether the user information is authenticated comprises determining a reproduction mode of the electronic device in response to a result of the determination of whether the user is authenticated.

17. The method of claim 13, wherein the determining of whether the user information is authenticated comprises:
when a plurality of user information is obtained, determining a plurality of authentication results for the plurality of user information; and
when at least one of the plurality of authentication results is not suitable for reproducing the contents, controlling the electronic device to operate in at least one of a turn-off mode for at least one unit of the electronic device, an image replacement mode, a sleep mode of the electronic device, a text message reproduction mode, a message transmission mode to another device, a contents inquiry prohibition mode, and a low specification mode for at least one unit of the electronic device.

18. The method of claim 13, wherein the determining of the reproduction of the electronic device comprises analyzing the attribute of the contents during a reproduction of the contents or before the reproduction of the contents.

19. A non-transitory computer-readable recording medium having a program recorded thereon, the program causing a computer to execute a method comprising:
obtaining at least one of user information and environment information;
determining whether contents which a user intends to reproduce are limited contents based on an attribute of the contents; and
in response to determining that the contents are limited, determining if the user information indicates an allowed user or determining if the environment information indicates an allowed environment, and determining a reproduction mode of contents, by limiting the contents reproduced to the user in response to at least one of the user information and the environment information.

20. The non-transitory computer-readable recording medium of claim 19,
wherein the environment information includes at least one of a current position of the electronic device, movement information of the electronic device, brightness information and ambient sound information, and
wherein the user information includes at least one of image information of a user of the electronic device and voice information of the user.

* * * * *